United States Patent
Woo et al.

(10) Patent No.: US 10,221,340 B2
(45) Date of Patent: Mar. 5, 2019

(54) CURABLE COMPOSITION

(71) Applicant: LG Chem, Ltd., Seoul (KR)

(72) Inventors: Dong Hyun Woo, Daejeon (KR); Se Woo Yang, Daejeon (KR); Myung Han Lee, Daejeon (KR)

(73) Assignee: LG Chem, Ltd. (KR)

( * ) Notice: Subject to any disclaimer, the term of this patent is extended or adjusted under 35 U.S.C. 154(b) by 222 days.

(21) Appl. No.: 15/106,997

(22) PCT Filed: Jun. 30, 2015

(86) PCT No.: PCT/KR2015/006699
§ 371 (c)(1),
(2) Date: Jun. 21, 2016

(87) PCT Pub. No.: WO2016/003156
PCT Pub. Date: Jan. 7, 2016

(65) Prior Publication Data
US 2017/0130103 A1    May 11, 2017

(30) Foreign Application Priority Data

Jun. 30, 2014  (KR) .................. 10-2014-0081020
Jun. 30, 2014  (KR) .................. 10-2014-0081022
Jun. 30, 2015  (KR) .................. 10-2015-0093073

(51) Int. Cl.
*C09J 109/00*   (2006.01)
*C08L 9/00*   (2006.01)
(Continued)

(52) U.S. Cl.
CPC .......... *C09J 109/00* (2013.01); *C08G 18/672* (2013.01); *C08L 9/00* (2013.01); *C08L 75/06* (2013.01);
(Continued)

(58) Field of Classification Search
CPC ...................................... C08G 18/672
See application file for complete search history.

(56) References Cited

U.S. PATENT DOCUMENTS 9,175,196 B2 * 11/2015 Ha ..................... C09J 175/16
2010/0247940 A1   9/2010 Takahashi et al.
(Continued)

FOREIGN PATENT DOCUMENTS

CN   102144009 A    8/2011
CN   102965067 A    3/2013
(Continued)

OTHER PUBLICATIONS

International Search Report for International Patent Application PCT/KR2015/006699 dated Sep. 22, 2015.
(Continued)

*Primary Examiner* — Michael F Pepitone
(74) *Attorney, Agent, or Firm* — Lerner, David, Littenberg, Krumholz & Mentlik, LLP

(57) ABSTRACT

The present application relates to a curable composition, a cured product and use of the curable composition and cured product. An exemplary curable composition may form a cured product having low permittivity and an excellent adhesive property, and thus may be usefully used for direct bonding of a variety of optical functional members of display devices, for example, direct bonding of a touch panel and a display panel.

13 Claims, 1 Drawing Sheet

(51) Int. Cl.
*G06F 3/041* (2006.01)
*C09J 175/06* (2006.01)
*C08L 75/06* (2006.01)
*C08G 18/67* (2006.01)
*C09J 175/16* (2006.01)
*C08L 75/16* (2006.01)

(52) U.S. Cl.
CPC ............ *C08L 75/16* (2013.01); *C09J 175/06* (2013.01); *C09J 175/16* (2013.01); *G06F 3/041* (2013.01)

(56) References Cited

U.S. PATENT DOCUMENTS

| | | | |
|---|---|---|---|
| 2012/0214936 A1 | 8/2012 | Fujita et al. | |
| 2014/0329927 A1 | 11/2014 | Ha et al. | |
| 2015/0079379 A1* | 3/2015 | Suzuki | ............... C08F 290/06 428/220 |

FOREIGN PATENT DOCUMENTS

| | | | | |
|---|---|---|---|---|
| CN | 103764701 A | 4/2014 | | |
| JP | 2004125868 A | 4/2004 | | |
| JP | 2005055641 | 3/2005 | | |
| JP | 2011190421 A | 9/2011 | | |
| JP | WO 2013187508 A1 * | 12/2013 | ............ | C08F 290/06 |
| KR | 20120094869 A | 8/2012 | | |
| KR | 20130063937 A | 6/2013 | | |
| KR | 101284998 B1 | 7/2013 | | |
| KR | 20140081020 A | 7/2014 | | |
| KR | 20140081022 A | 7/2014 | | |
| WO | WO 2013085132 A1 * | 6/2013 | ............ | C09J 175/16 |

OTHER PUBLICATIONS

Search report from Chinese Office Action for Application No. 2015800059474 dated Jul. 24, 2017.

* cited by examiner

CURABLE COMPOSITION

CROSS-REFERENCE TO RELATED APPLICATION

The present application is a national phase entry under 35 U.S.C. § 371 of International Application No. PCT/KR2015/006699, filed Jun. 30, 2015, which claims priority from Korean Patent Application No. 10-2014-0081020, filed Jun. 30, 2014, Korean Patent Application No. 10-2014-0081022, filed Jun. 30, 2014, and Korean Patent Application No. 10-2015-0093073, filed Jun. 30, 2015, all of which are incorporated herein by reference.

TECHNICAL FIELD

The present application relates to a curable composition, a cured product and use of the curable composition and cured product.

Background Art

A display device, for example, as shown in FIG. 3, may include a touch panel 302 mounted on a display panel 301. Here, a spacer 303 may be interposed between the display panel and the touch panel to form an air gap 304 between the display panel and the touch panel, in order to protect the display panel. However, the air gap between the display panel and the touch panel causes light scattering, and thus contrast is reduced. Further, the presence of the air gap inhibits slimming of the panel.

In view of the above problems, a technique of filling the air gap between the display panel and the touch panel with a resin such as an optically clear resin (OCR) has been suggested as disclosed in Patent document 1 (Japanese Laid-Open Patent Publication No. 2005-55641). Physical properties required for the OCR include optical properties, a shrinkage rate, permittivity, a degree of crosslinking, an adhesive property, etc. Especially, proper correlations between the physical properties of the OCR are required to exhibit the excellent adhesive property, and although a variety of research regarding standards of the physical properties has already been conducted, little research on parameters obtained by mathematizing the correlations between the physical properties has been conducted.

DISCLOSURE

Technical Problem

The present application provides a curable composition, a cured product and use of the curable composition and cured product.

Technical Solution

The present application relates to a curable composition. The inventors of the present application determined that a curable composition having physical properties suitable for optical use, for example, a curable composition which may be suitably used for a so-called optically clear resin (OCR), may be provided by adjusting correlations between a dielectric constant, a gel fraction, a shrinkage rate and a storage modulus, thus completing the present application. The correlations may be satisfied by adjusting components included in the curable composition and a content ratio thereof as will be described below, although this is not entirely clear. When the curable composition satisfies the correlations, a cured product having low permittivity and an excellent adhesive property may be prepared. An exemplary curable composition, for example, may satisfy the relationship of the following Expression 1.

$$\frac{A \times B \times C}{D} \times 1000 \geq 30 \qquad \text{[Expression 1]}$$

In Expression 1, A represents a dielectric constant of the composition at 1 MHz after curing, B represents a gel fraction (%) of the composition after curing, C represents a shrinkage rate (%) of the composition after curing, and D represents a storage modulus (Pa) of the composition after curing.

The dielectric constant A in Expression I, for example, may be calculated by preparing a standard sample having a size of 2 cm×2 cm (width×height) and a copper plate/cured product/copper plate-laminated structure using a cured product of the composition, measuring permittivity of the sample using an Agilent 4294A precision impedance analyzer and calculating a value of the permittivity of the sample in a vacuum.

The gel fraction B in Expression 1, for example, may be calculated based on a value obtained by cutting a cured product of the composition to a size having a diameter of 2.5 mm and a thickness of 1 mm to prepare a circular sample, depositing the circular sample in an excess amount of ethyl acetate and leaving it for 24 hours, melting an uncured portion for filtering using a filter, drying separated insoluble fractions in an oven at 150° C. for 30 minutes to 1 hour, and measuring a change in mass of the sample before and after the drying.

The shrinkage rate C in Expression 1, for example, may be calculated from a value obtained by cutting a cured product of the composition to a size having a diameter of 2.5 mm and a thickness of 1 mm to prepare a circular sample, and measuring a change in specific gravity of the sample before and after curing.

The storage modulus D in Expression 1, for example, may be measured from the circular sample prepared by cutting a cured product of the composition to a size having a diameter of 8 mm and a thickness of 1 mm, and using an advanced rheometrics expansion system (ARES) at a frequency of 1 Hz in a frequency sweep mode.

An exemplary curable composition may have a value of 30 or more calculated by Expression 1. More specifically, the value calculated by Expression 1 may be 35 or more, 40 or more, 45 or more, 50 or more, 55, or more, 60 or more or 65 or more. Such a curable composition may exhibit low permittivity and an excellent adhesive property. Further, the upper limit of the value calculated by Expression 1 is not particularly limited and may be suitably set according to desired use. For example, the upper limit may be 200 or less, 190 or less, 180 or less, 170 or less, 160 or less, 150 or less, 145 or less, 140 or less or 135 or less.

An exemplary curable composition may have low permittivity after curing. For example, the dielectric constant of the curable composition at 1 MHz after curing may be 3.5 or less, 3.4 or less, 3.3 or less, 3.2 or less, 3.1 or less, 3.0 or less, 2.9 or less, 2.8 or less, 2.7 or less, 2.6 or less or 2.5 or less. Such a curable composition, for example, may be usefully used for adhesion of an optical member such as a touch panel that detects an electronic signal and senses a position. The lower limit of the dielectric constant is not particularly limited and may be suitably set according to desired use. For example, the dielectric constant of the curable composition at 1 MHz after curing may be 2.0 or more, 2.1 or more, 2.2 or more, 2.3 or more, 2.4 or more or 2.5 or more. The permittivity in the above-described range may be obtained by, for example, suitably adding a rubber component which will be described below to the curable composition.

An exemplary curable composition may have a gel fraction suitable for adhesion of optical members after curing. For example, the gel fraction of the curable composition after curing may be, for example, 30% or more, 30.5% or more. 31% or more, 31.5% or more or 32.5% or more. Further, the upper limit of the gel fraction may be, for example, 80% or less, 79.5% or less, 79% or less, 78.5% or less, 78% or less, 77.5% or less, 77% or less, 76.5% or less or 76% or less. Such a curable composition may exhibit an excellent adhesive property, and thus, for example, may be usefully used for adhesion of optical members such as touch panels, display panels, etc. Furthermore, the gel fraction satisfying the above-described range may be obtained by, for example, suitably adding a rubber component which will be described below to the curable composition.

Moreover, an exemplary curable composition may have a low shrinkage rate after curing. For example, the shrinkage rate of the curable composition after curing may be 3.0% or less, 2.95% or less, 2.90% or less, 2.85% or less, 2.80% or less, 2.75% or less, 2.70% or less or 2.65% or less. Such a curable composition may prevent a change in size, bending or the like of an adherend due to stress during cure shrinkage of a resin composition, and thus, for example, may be usefully used for adhesion of optical members such as touch panels, display panels, etc. The lower limit of the shrinkage rate after curing is not particularly limited and may be suitably set according to desired use, and for example, may be 1% or more, 1.1% or more, 1.2% or more. 1.3% or more, 1.4% or more. 1.5% or more, 1.6% or more, 1.7% or more or 1.8% or more. Furthermore, the shrinkage rate satisfying the above-described range may be obtained by, for example, suitably adding a rubber component which will be described below to the curable composition.

Further, an exemplary curable composition may have a storage modulus suitable for adhesion of optical members. For example, the storage modulus of the curable composition after curing may be 20,000 Pa or less, 19,000 Pa or less, 18,000 Pa, or less, 17,0000 Pa or less, 16,000 Pa or less, 15,000 Pa or less, 14,000 Pa or less, 13,000 Pa or less, 12,000 Pa or less, 11,000 Pa or less, 10,000 Pa or less, 9,500 Pa or less, 9,000 Pa or less, 8,500 Pa or less, 8,000 Pa or less, 7,500 Pa or less, 7,000 Pa or less, 6,500 Pa or less or 6,000 Pa or less. Such a curable composition, for example, may endure expansion and contraction of an adherend under a high temperature environment and peeling or the like may be suppressed, and thus it may be usefully used for adhesion of optical members such as touch panels, display panels, etc. The lower limit of the storage modulus of the curable composition after curing is not particularly limited and may be suitably set according to desired use. For example, the lower limit may be 1 Pa or more, 100 Pa or more, 500 Pa or more, 1,000 Pa or more, 2,000 Pa or more, 2,100 Pa or more, 2,200 Pa or more, 2,300 Pa or more, 2,400 Pa or more, 2,500 Pa or more or 2,600 Pa or more. The storage modulus satisfying the above-described range, for example, may be achieved by reducing a crosslinking density or a gel fraction to decrease a storage modulus. To this end, for example, a rubber component may be added to the curable composition, or reactivity of oligomers may be adjusted using a suitable amount of monomers.

Further, an exemplary curable composition may have an excellent pressure-sensitive adhesive force or adhesive force. For example, the curable composition may have a peel strength with respect to glass at room temperature, a peel angle of 180° and a peel rate of 300 mm/min after curing of 0.3 N/m or more, 0.34 N/m, 0.36 N/m or more, 0.38 N/m or more, 0.40 N/m or more or 0.42 N/m or more. Excellent peel strength of the curable composition after curing may be achieved using the curable composition satisfying the correlation of Expression 1. The upper limit of the peel strength is not particularly limited and may be suitably set according to desired use.

Moreover, an exemplary curable composition may form a cured product having excellent translucency. For example, the curable composition may have transmittance in the visible region of 80% or more, 82% or more, 84% or more, 86% or more, 88% or more, 90% or more, 92% or more, 94% or more, 96% or more, 98% or more or 99% or more after curing. Such a curable composition has superior translucency, and thus may be usefully used for adhesion between optical members of display devices.

An exemplary curable composition may include an active energy ray curable oligomer. As this oligomer, oligomers having a functional group which may be cured by active energy ray irradiation, for example, UV irradiation or the like, may be selected and used. For example, a (meth) acrylate oligomer may be selected and used. The term "(meth)acrylate oligomer" used herein may refer to an oligomer having at least one (meth)acryloyl group in its molecule. In terms of curability, an oligomer having at least two (meth)acryloyl groups in its molecule may be suitably used. For example, an oligomer having 2 to 6, 2 to 4, or two (meth)acryloyl groups in its molecule may be used as the (meth)acrylate oligomer, but the oligomer is not limited thereto.

The main chain backbone of the oligomer, for example, the main chain backbone of the oligomer having a (meth) acryloyl group, is not particularly limited, but may be, for example, at least one selected from a polydiene backbone having a functional group such as a hydroxyl group, a carboxyl group or the like at its terminal, a polydiene backbone having no functional group such as a hydroxyl group, a carboxyl group or the like at its terminal, a hydrogenated polydiene, polyester, dibutylene glycol, polycarbonate and polyether. The term "polydiene" used herein refers to a polymer prepared using monomers having two carbon-carbon double bonds. Examples of the polydiene may include polyisoprene, polybutadiene, styrene-butadiene, a copolymer of ethylene and propylene (EPM), a terpolymer of ethylene, propylene and a non-conjugated diene (EPDM) or the like, but are not limited thereto. As a specific example of the oligomer, an active energy ray curable oligomer having a polybutadiene backbone with a hydroxyl group may be used, but the present application is not limited thereto.

For example, at least one selected from the group consisting of a urethane-based (meth)acrylate oligomer, a polyester-based (meth)acrylate oligomer, a polyether-based (meth)acrylate oligomer, an epoxy-based (meth)acrylate oligomer, a diene polymer-based (meth)acrylate oligomer and an oligomer having a main chain of a hydrogenated diene polymer-based (meth)acrylate may be selected and used as the (meth)acrylate oligomer.

For example, the urethane-based (meth)acrylate oligomer may refer to a (meth)acrylate oligomer having a urethane bond in its molecule. For example, the urethane-based (meth)acrylate oligomer may be prepared by esterification of a polyurethane oligomer using (meth)acrylic acid, the polyurethane oligomer prepared by the reaction of polybutadiene diol, polyether polyol, polyester polyol, polycarbonate diol or the like and polyisocyanate. A polybutadiene-modified urethane-based (meth)acrylate prepared by (meth)acrylic modification of a polybutadiene is also included as an example of the urethane-based (meth)acrylate oligomer. A hydrogenated polybutadiene-modified urethane-based (meth)acrylate prepared by (meth)acrylic modification of a hydrogenated polybutadiene is also included as an example of the urethane-based (meth)acrylate oligomer. Examples of the urethane-based (meth)acrylate oligomer may include a 1,2-polybutadiene-modified urethane-based (meth)acrylate oligomer, a polyester urethane-based (meth)acrylate oligomer, a dibutyl glycol urethane-based (meth)acrylate oligomer, a polycarbonate urethane-based (meth)acrylate oligomer, a polyether urethane-based (meth)acrylate oligomer, etc.

For example, the polyester-based (meth)acrylate oligomer may be prepared by esterification of a hydroxyl group of a polyester oligomer using (meth)acrylic acid, the polyester oligomer having the hydroxyl group at its both terminal and prepared by condensation of a polyvalent carboxylic acid and a polyvalent alcohol, or may be prepared by esterification of a hydroxyl group at the terminal of an oligomer prepared by adding an alkylene oxide to a polyvalent carboxylic acid using (meth)acrylic acid.

For example, the polyether-based (meth)acrylate oligomer may be prepared by esterification of the hydroxyl group of polyetherpolyol using (meth)acrylic acid.

For example, the epoxy-based (meth)acrylate oligomer may be prepared by reacting an oxirane ring of a bisphenol type epoxy resin or a novolac type epoxy resin having a relatively low molecular weight with (meth)acrylic acid and esterifying it. Furthermore, a carboxyl-modified epoxy (meth)acrylate oligomer prepared by partially modifying an epoxy-based (meth)acrylate oligomer using a dibasic acid anhydride may also be used.

Examples of the diene polymer-based (meth)acrylate oligomer may include SBR di(meth)acrylate prepared by (meth)acrylic modification of a liquid styrene-butadiene copolymer, polyisoprene di(meth)acrylate prepared by (meth)acrylic modification of a polyisoprene, etc.

An oligomer having a backbone of hydrogenated diene polymer-based (meth)acrylate may be prepared, for example, by esterification of the hydroxyl group of hydrogenated polybutadiene or hydrogenated polyisoprene having the hydroxyl groups at its both terminals using (meth)acrylic acid.

One or a combination of two or more of these oligomers having a (meth)acryloyl group may be used. In the oligomers, a urethane-based (meth)acrylate oligomer may be selected and used in terms of curability, and especially, a bifunctional urethane-based (meth)acrylate oligomer may be selected and used. The bifunctional urethane-based (meth)acrylate oligomer may represent that two (meth)acryloyl groups are included in one molecule of a urethane-based (meth)acrylate oligomer.

The bifunctional urethane-based (meth)acrylate oligomer may be prepared by esterification of polyurethane oligomer using (meth)acrylic acid. A polyurethane oligomer may be prepared by the reaction of a polyether polyol, polyester polyol or polycarbonatediol having two hydroxyl groups in its molecule and a polyisocyanate.

An example of the polyether polyol having two hydroxyl groups may include a compound prepared by adding ethylene oxide, propylene oxide or the like to polyethylene glycol, polypropylene glycol, polytetramethylene glycol (polybutylene glycol), polyhexamethylene glycol, 1,3-butylene glycol, 1,4-butylene glycol, neopentyl glycol, cyclohexanedimethanol, 2,2-bis(4-hydroxycyclohexyl) propane, bisphenol A, etc.

The polyester polyol having two hydroxyl groups may be obtained, for example, by the reaction of an alcohol component and an acid component. For example, compounds prepared by adding ethylene oxide, propylene oxide or the like, or ε-caprolactone to polyethylene glycol, polypropylene glycol, polytetramethylene glycol (polybutylene glycol), 1,3-butylene glycol, 1,4-butylene glycol, 1,6-hexanediol, neopentyl glycol, 1,4-cyclohexanedimethanol, 2,2-bis(4-hydroxycyclohexyl) propane, bisphenol A or the like may be used as the alcohol component, and a dibasic acid such as adipic acid, sebacic acid, azelaic acid, dodecanedioic acid or the like and anhydrides thereof may be used as the acid component, and the alcohol component and acid component may be reacted to prepare the polyester polyol having two hydroxyl groups. A compound prepared by reacting the alcohol components, acid components and ε-caprolactone at the same time may also be used as the polyester polyol.

A weight average molecular weight or number average molecular weight of the urethane-based (meth)acrylate oligomer may be, for example, in the range of 500 to 100,000 or 1,000 to 50,000 in terms of handleability, etc. These values are not particularly limited, and for example, may be 500, 1,000, 2,000, 3,000, 4,000, 5,000, 7,000, 10,000, 20,000, 30,000, 40,000, 50,000 or 100,000. The above-described average molecular weight is a conversion value with respect to standard polystyrene measured by gel permeation chromatography (GPC).

The content of the active energy ray curable oligomer may be included, for example, at 10 wt % or more, 11 wt % or more, 12 wt % or more, 13 wt % or more, 14 wt % or 15 wt % or more, and may also be included at 20 wt % or less, 19 wt % or less, 18 wt % or less, 17 wt % or less, 16 wt % or less or 15 wt % or less in the curable composition in terms of preparation of the curable composition satisfying Expression 1.

Furthermore, the curable composition may further include a photoinitiator. As the photoinitiator, any photoinitiator may be used without limitation insofar as the photoinitiator may initiate polymerization of an active energy ray curable oligomer such as a (meth)acrylate oligomer. Examples of the photoinitiator may include a UV polymerization initiator, a visible light polymerization initiator, etc. Examples of the UV polymerization initiator may include a benzoin-based polymerization initiator, a benzophenone-based polymerization initiator, an acetophenone-based polymerization initiator or the like, and examples of the visible light polymerization initiator may include an acyl phosphine oxide-based polymerization initiator, a thioxanthone-based polymerization initiator, a metallocene-based polymerization initiator, a quinone-based polymerization initiator, an α-aminoalkylphenone-based polymerization initiator, etc. Specifically, examples of the photoinitiator may include benzophenone. 4-phenyl benzophenone, benzoyl benzoic acid, 2,2-diethoxyacetophenone, bisdiethylamino benzophenone, benzyl, benzoin, benzoyl isopropyl ether, benzyl dimethyl ketal, 1-hydroxycyclohexyl phenyl ketone, thioxanthone, 2-methyl thioxanthone, 2,4-dimethyl thioxanthone, isopropyl thioxanthone, 2,4-diethyl thioxanthone, 2,4-diisopropyl thioxanthone, 1-(4-isopropylphenyl)2-hydroxy-2-methyl-propan-1-one, 1-(4-(2-hydroxyethoxy)-phenyl)-2-hydroxy-2-methyl-1-propan-1-one, 2-hydroxy-2-methyl-1-phenyl-propan-1-one, camphor quinone, 2,4,6-trimethylbenzoyl diphenylphosphine oxide, bis(2,4,6-trimethylbenzoyl)-phenylphosphine oxide, 2-methyl-1-(4-(methylthio)phenyl)-2-morpholinopropan-1-one, 2-benzyl-2-dimethylamino-1-(4-morpholinophenyl)-1-butanone-1,2-dimethylamino-2-(4-methyl-benzyl)-1-(4-morpholin-4-yl-phenyl)-butan-1-one, bis(2,6-dimethoxybenzoyl)-2,4,4-trimethyl-pentyl phosphine oxide or the like, but are not limited thereto.

Further, an exemplary curable composition may further include a rubber component. The rubber component may include a polydiene. Examples of the rubber component may include a compound having a polyisoprene backbone or a polybutadiene backbone, a styrene-butadiene backbone, a copolymer of ethylene and propylene (EPM) or a copolymer of ethylene, propylene, and a non-conjugated diene (EPDM) or the like, but are not limited thereto.

In an example, the rubber component may have a functional group such as a hydroxyl group, a carboxyl group or the like at its terminal. An example of the rubber component may include a polydiene having a functional group such as a hydroxyl group, a carboxyl group or the like at its terminal. As a specific example of the rubber component, a polybutadiene rubber having a hydroxyl group may be used, but the present application is not limited thereto. Furthermore, a weight average molecular weight of the rubber component may be suitably selected in the range not inhibiting the purpose of the present application, and for example, may be in the range of about 1,000 to about 10,000, about 1,000 to about 5,000 or about 2,000 to 3,000, but is not limited thereto.

The content of the rubber component in the curable composition may be, for example, 50 wt % or more, 52 wt % or more, 54 wt % or more, 56 wt % or more, 58 wt % or 60 wt % or more, and may be 70 wt % or less, 68 wt % or less, 66 wt % or less, 64 wt % or less, 62 wt % or less or 60 wt % or less. When the curable composition includes the rubber component in the above-described ratio, the curable composition satisfying the condition of Expression 1 my be provided.

An exemplary curable composition may further include a monomer in addition to the oligomer for the purpose of dilution and reactivity adjustment of an active energy ray curable oligomer such as a (meth)acrylate oligomer. The content of this monomer in the curable composition may be, for example, 10 wt % or more, 12 wt % or more, 14 wt % or more, 16 wt % or more, 18 wt % or 20 wt % or more, and may be 30 wt % or less, 28 wt % or less, 26 wt % or less, 24 wt % or less, 22 wt % or less or 20 wt % or less.

As the monomer, for example, a (meth)acrylate monomer may be used, and specifically, a monofunctional (meth) acrylate or a polyfunctional (meth)acrylate such as a bifunctional, trifunctional, tetrafunctional, pentafunctional or hexafunctional (meth)acrylate may be used. For example, the monofunctional (meth)acrylate or the bifunctional (meth)acrylate may be selected and used.

Examples of the monofunctional(meth)acrylate may include methyl (meth)acrylate, ethyl (meth)acrylate, propyl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth) acrylate, phenyl (meth)acrylate, phenoxyethyl (meth)acrylate, phenoxy ethyleneglycol (meth)acrylate, phenoxy tetraethyleneglycol (meth)acrylate, phenoxy polyethyleneglycol (meth)acrylate, nonyl phenoxyethyl (meth)acrylate, nonylphenoxy tetraethyleneglycol (meth)acrylate, methoxy diethyleneglycol (meth)acrylate, ethoxy diethyleneglycol (meth) acrylate, butoxyethyl (meth)acrylate, butoxy triethyleneglycol (meth)acrylate, 2-ethylhexyl polyethyleneglycol (meth)acrylate, nonylphenyl polypropyleneglycol (meth)acrylate, methoxydipropylene glycol (meth) acrylate, glycidyl (meth)acrylate, glycerol (meth)acrylate, polyethyleneglycol (meth)acrylate, polypropyleneglycol (meth)acrylate, epichlorohydrin (hereinafter referred to as "ECH")-modified butyl (meth)acrylate, epichlorohydrin (hereinafter referred to as "ECH")-modified phenoxy (meth)acrylate, ethylene oxide (hereinafter referred to as "EO")-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth) acrylate, EO-modified phosphoric acid (meth)acrylate or the like, and a (meth)acrylate having an imide group such as imide (meth)acrylate (product name: M-140, manufactured by Toa Gosei Co., Ltd.)

Examples of the polyfunctional (meth)acrylate may include di(meth)acrylated isocyanurate, tri(meth)acrylated isocyanurate, 1,3-dibutyleneglycol di(meth)acrylate, 1,4-butanediol di(meth)acrylate, 1,6-hexanediol di(meth)acrylate, 1,9-nonanediol di(meth)acrylate, EO-modified bisphenol A di(meth)acrylate, diethyleneglycol di(meth)acrylate, ECH-modified hexahydrophthalic acid di(meth)acrylate, neopentylglycol di(meth)acrylate, EO-modified neopentylglycol di(meth)acrylate, caprolactone-modified hydroxypivalic acid ester neopentylglycol di(meth)acrylate, stearic acid-modified pentaerythritol di(meth)acrylate, ECH-modified phthalic acid diacrylate, poly(ethylene glycol-tetramethylene glycol) di(meth)acrylate, polyethyleneglycol di(meth) acrylate, polypropyleneglycol di(meth)acrylate, ECH-modified propyleneglycol di(meth)acrylate, tricyclodecane dimethanol (meth)acrylate, tripropyleneglycol di(meth) acrylate, triglycerol di(meth)acrylate, ECH-modified glycerol tri(meth)acrylate, pentaerythritol tri(meth)acrylate, EO-modified phosphoric acid tri(meth)acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris((meth)acryloxyethyl) isocyanurate, dipentaerythritol hexa(meth)acrylate, pentaerythritol tetra(meth)acrylate, pentaerythritolethoxy tetra(meth) acrylate, etc.

The curable composition may further include a well-known silane coupling agent to improve adhesion to an adherend, for example, adhesion to glass. Furthermore, the curable composition may further include well-known paraffins to promote curing of a portion in contact with air. Moreover, the curable composition may further include a well-known antioxidant including a polymerization inhibitor for the purpose of maintaining storage stability. Further, the curable composition may further include a well-known additive such as an elastomer, a plasticizer, a filler, a coloring agent, a corrosion inhibitor or the like according to the desired use.

Further, the present application relates to a cured product. An exemplary cured product may satisfy a relation of the following Expression 1.

$$\frac{A \times B \times C}{D} \times 1000 \geq 30 \qquad \text{[Expression 1]}$$

In Expression 1, A represents a dielectric constant of the cured product at 1 MHz, B represents a gel fraction (%) of the cured product, C represents a shrinkage rate (%) of the cured product, and D represents a storage modulus (Pa) of the cured product.

An exemplary cured product, for example, may include the curable composition in a cured state. The term "cured state" used herein may refer to a state in which components included in the composition are hardened through a cross-linking reaction, a polymerization reaction, etc. For the dielectric constant, gel fraction, shrinkage rate and storage modulus of the cured product according to Expression 1, the same description as the aforementioned dielectric constant, gel fraction, shrinkage rate and storage modulus of the curable composition may be applied.

An exemplary cured product may be prepared by curing the curable composition. A curing method is not particularly limited, and may include a method of maintaining the composition at a suitable temperature to perform a cross-linking reaction of the active energy ray curable oligomer as described above in the curable composition, or a method of irradiation of suitable active energy rays to perform a polymerization reaction. When the method of maintaining a suitable temperature and the method of active energy ray irradiation are both required to be performed, the processes may be sequentially or simultaneously performed. The active energy ray irradiation may be performed, for example, by a high-pressure mercury lamp, an electrodeless lamp, a xenon lamp or the like, and conditions of the wavelength, light amount or the like of radiated active energy rays may be selected in the range in which cross-linking or polymerization of the active energy ray curable oligomer is suitably performed.

Further, the present application relates to use of the curable composition or cured product. The curable composition or cured product has low permittivity and an excellent adhesive property, and thus may be usefully used for adhesion of various optical members in the display device. For example, the curable composition or cured product may be used for adhesion of a display body and an optical functional material. An example of the display body may include a display element such as a liquid crystal display (LCD) to which a polarizing plate with respect to glass is attached, an electroluminescence (EL) display device, an EL lighting, electronic paper, a plasma display, etc. Examples of the optical functional material may include an acrylic plate (for example, a hard-coating treatment or anti-reflection coating may be performed on one or both surfaces thereof) for improving visibility and preventing breakage of a display element due to an external shock, a transparent plastic plate such as a polycarbonate (PC) plate, a polyethylene terephthalate (PET) plate, a polyethylene naphthalate (PEN) plate or the like, tempered glass (for example, a shatterproof film may be attached) or a touch panel input sensor, etc.

Moreover, the curable composition or cured product may be usefully used for adhesion between a transparent substrate on which a transparent electrode is formed and a transparent plate in a capacitive touch panel. Examples of materials of the transparent substrate may include PC, polymethyl methacrylate (PMMA), a composite of PC and PMMA, a cyclo-olefin copolymer (COC), and a cyclo-olefin polymer (COP). Examples of materials of the transparent plate may include glass, PC, PMMA, a composite of PC and PMMA, a COC, a COP, etc.

Furthermore, the curable composition or cured product may be usefully used for adhesion between a touch panel and a sheet or plate on the touch panel. Examples of the sheet may include an icon sheet, a protective sheet, a decorative sheet, or the like, and examples of materials of the sheet may include PET, PC, a COC, a COP, etc. Examples of the plate may include a decorative plate, a protective plate or the like, and examples of materials of the plate may include PET glass, PC, PMMA, a composite of PC and PMMA, a COC, a COP, etc. Examples of materials of the touch panel adhered to the sheet may include glass, PET, PC, PMMA, a composite of PC and PMMA, a COC, a COP, etc.

Further, the curable composition or cured product may be usefully used for direct bonding between a touch panel and a display panel in a display device. FIG. 1 exemplary shows a display device including the display panel 101 and the touch panels 102, where the display panel 101 and the touch panels 102 are adhered to each other by the curable composition or cured product 103.

Further, the curable composition or cured product may be used for filling a space between the optical functional materials, which is formed by a spacer in the display device. FIG. 2 exemplary shows a display device including a touch panel as the optical functional material. Referring to FIG. 2, the display device may include the display panel 201, the touch panel 202 and the spacer 203 spacing the display panel away from the touch panel. Here, the display device has a structure in which the space between the display panel and the touch panel, a so-called air gap space, is filled with the curable composition or cured product 204.

When the curable composition or cured product is applied in the display device, other components forming the device or methods of forming the device are not particularly limited, and any arbitrary material or method may be used insofar as the curable composition or cured product is used therein.

Advantageous Effects

An exemplary curable composition can form a cured product having low permittivity and an excellent adhesive property, and thus can be usefully used for direct bonding of a variety of optical functional members of display devices, for example, direct bonding of a touch panel and a display panel.

MODES OF THE INVENTION

Figure 1:
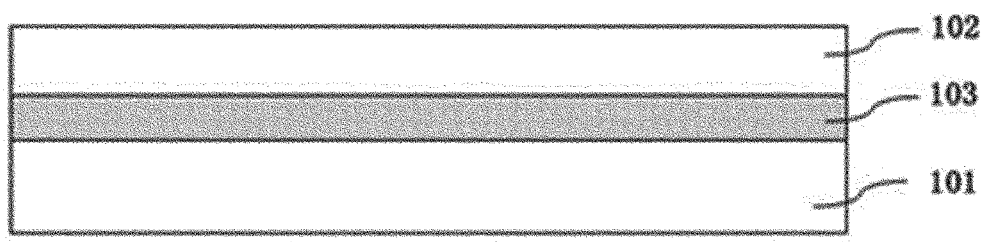
FIGS. 1 and 2 are schematic views of an exemplary display device of the present application.
Figure 2:
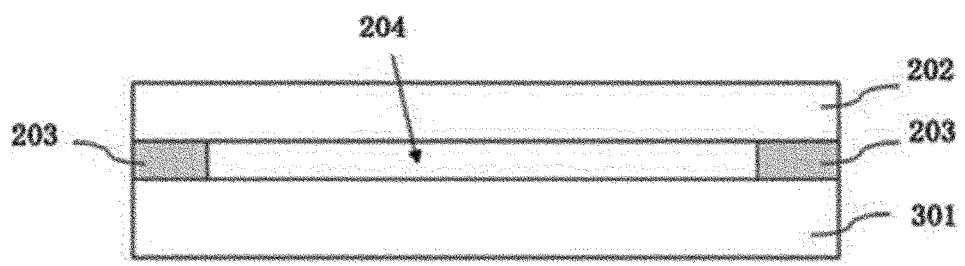
Figure 3:
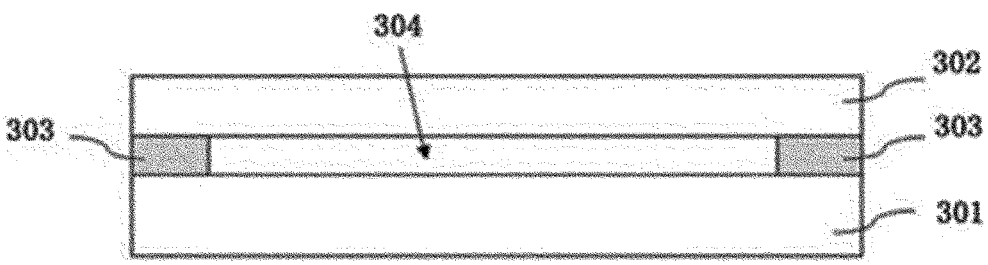
FIG. 3 is a schematic view of a display device relating to prior art.

Hereinafter, the curable composition will be described in detail in conjunction with examples according to the present application, but the scope of the present application is not limited to the following examples.

A storage modulus, a shrinkage rate, a gel fraction and a dielectric constant of examples and comparative examples were measured according to the following methods.

1. Measurement of Storage Modulus

After circular samples were prepared by cutting cured products prepared in examples and comparative examples to a size having a diameter of 8 mm and a thickness of 1 mm, storage moduli were measured using an advanced rheometrics expansion system (ARES) at a frequency of 1 Hz in a frequency sweep mode.

2. Measurement of Shrinkage Rate

After circular samples were prepared by cutting cured products prepared in examples and comparative examples to a size having a diameter of 2.5 mm and a thickness of 1 mm, specific gravities were measured before and after curing to calculate shrinkage rates according to the following expression.

$$\text{Shrinkage rate } (\%) = \frac{\text{specific gravity before curing} - \text{specific gravity after curing}}{\text{specific gravity before curing}} \times 100$$

3. Measurement of Gel Fraction

Gel fractions were calculated based on values obtained by cutting cured products prepared in examples and comparative examples to a size having a diameter of 2.5 mm and a thickness of 1 mm to prepare circular samples, depositing the circular samples in an excess amount of ethyl acetate and leaving them for 24 hours, melting uncured portions for filtering using a filter, drying separated insoluble fractions in an oven at 150° C. for 30 minutes to 1 hour, and measuring changes in mass of the samples before and after the drying.

4. Measurement of Dielectric Constant

Dielectric constants were calculated by preparing standard samples having a size of 2 cm×2 cm (width×height) and a copper plate/cured product/copper plate-laminated structure using cured products prepared in examples and comparative examples, measuring permittivity of the samples using an Agilent 4294A precision impedance analyzer and calculating a value of permittivity of the samples in a vacuum.

EXAMPLE 1

Preparation of Curable Composition

A curable composition was prepared by uniformly mixing 18 g of polyurethane acrylate (hereinafter referred to as "oligomer A") having a weight average molecular weight of 15,000 and including a polybutadiene rubber having a hydroxyl group and 2 g of polyurethane acrylate (hereinafter referred to as "oligomer B") having a weight average molecular weight of 10,000 and including a polybutadiene rubber having a hydroxyl group as oligomers, 60 g of a polybutadiene rubber (hereinafter referred to as "rubber A") having a hydroxyl group and a weight average molecular weight of 2,000 as a rubber component, 20 parts by weight of isobonyl acrylate as a monomer and 1 g of Darocur TPO as a photoinitiator.

Preparation of Cured Product

Cured products having a predetermined size which is differed according to measurement samples were prepared by applying the curable composition prepared as above on a glass substrate to a thickness of about 0.2 mm and irradiating it with UV light having a long wavelength band of about 365 nm to 400 nm using an LED or a metal-halide lamp.

EXAMPLES 2 to 12

Cured products were prepared in the same manner as in Example 1 except that the compositions of the curable composition in Example 1 were adjusted as in the following Table 1.

TABLE 1

| Example | Oligomer A | Oligomer B | Oligomer C | Rubber A | Rubber B | Monomer IBOA | Etc. S.C | Initiator |
|---|---|---|---|---|---|---|---|---|
| 1 | 18 | 2 | — | 60 | — | 20 | — | 1 |
| 2 | 16 | 4 | — | 60 | — | 20 | — | 1 |
| 3 | 14 | 6 | — | 60 | — | 20 | — | 1 |
| 4 | 18 | — | 2 | 60 | — | 20 | — | 1 |
| 5 | 16 | — | 4 | 60 | — | 20 | — | 1 |
| 6 | 14 | — | 6 | 60 | — | 20 | — | 1 |
| 7 | 20 | — | — | — | 60 | 20 | 0.5 | 1 |
| 8 | 20 | — | — | 60 | — | 20 | 0.5 | 1 |
| 9 | 22 | — | — | — | 60 | 18 | 0.5 | 1 |
| 10 | 20 | — | — | — | 60 | 20 | 0.25 | 1 |
| 11 | 20 | — | — | — | 60 | 20 | 1 | 1 |
| 12 | 20 | — | — | — | 60 | 20 | 2 | 1 |

Unit of content (g)
Oligomer A: polyurethane acrylate including polybutadiene rubber having hydroxyl group (weight average molecular weight: 15,000)
Oligomer B: polyurethane acrylate including polybutadiene rubber having hydroxyl group (weight average molecular weight: 10,000)
Oligomer C: polyurethane acrylate including polybutadiene rubber having hydroxyl group (weight average molecular weight: 10,000, but acrylate content increased 10% as compared to oligomer B)
Rubber A: polybutadiene rubber having hydroxyl group (weight average molecular weight: 2,000)
Rubber B: polybutadiene rubber having hydroxyl group (weight average molecular weight: 3,000)
IBOA: isobonyl acrylate
S.C (silane coupling agent for improving adhesive force): 3-(trimethoxysiyl)propyl methacrylate
Initiator: Darocur TPO

COMPARATIVE EXAMPLES 1 to 3

Cured products were prepared in the same manner as in Example 1 except that the compositions of the curable composition in Example 1 were adjusted as the following Table 2.

TABLE 2

| Comparative Example | Oligomer D | Rubber C | Monomer IBOA | Monomer DA | Etc. Plasticizer | Initiator |
|---|---|---|---|---|---|---|
| 1 | 20 | 60 | 20 | — | — | 1 |
| 2 | 20 | — | 20 | — | 60 | 1 |
| 3 | 60 | — | — | 40 | — | 1 |

Unit of content: parts by weight (g)
Oligomer D: polyurethane acrylate having no hydroxyl group (weight average molecular weight: 15,000)
Rubber C: isoprene rubber
DA: dodecyl acrylate
Plasticizer: DINCH
Initiator: Darocur TPO Storage moduli, shrinkage rates, gel fractions and dielectric constants in Examples 1 to 12 and Comparative Examples 1 to 3 were measured, and the evaluation results of values calculated according to the following Expression 1 and peel strength with respect to glass are listed in Table 3. The peel strength was measured at room temperature, a peel rate of 300 mm/min and a peel angle of 180° using TA-XT2plus.

$$\frac{A \times B \times C}{D} \times 1000 \geq 30 \qquad \text{[Expression 1]}$$

Referring to the following Table 3, it can be determined that Examples 1 to 12 in which the value of Expression I was 30 or more showed low permittivity, and notably excellent peel strength as compared to Comparative Examples 1 to 3 in which the value of Expression 1 was less than 30.

TABLE 3

| | Storage modulus (Pa) | Shrinkage rate (%) | Gel fraction (%) | Dielectric constant (1 MHz) | Value of Expression 1 | Peel strength (N/mm) |
|---|---|---|---|---|---|---|
| Example 1 | 2965 | 1.88 | 32 | 2.45 | 49 | 0.51 |
| Example 2 | 3026 | 2.35 | 34 | 2.68 | 71 | 0.45 |
| Example 3 | 3185 | 2.22 | 37 | 2.71 | 70 | 0.43 |
| Example 4 | 2684 | 2.29 | 57 | 2.78 | 135 | 0.72 |
| Example 5 | 2962 | 2.19 | 33 | 2.72 | 66 | 0.42 |
| Example 6 | 3599 | 2.6 | 48 | 2.91 | 101 | 0.7 |
| Example 7 | 4251 | 2.55 | 50 | 2.8 | 84 | 0.55 |
| Example 8 | 5614 | 2.32 | 53 | 2.83 | 62 | 0.54 |
| Example 9 | 4218 | 2.61 | 76 | 2.43 | 114 | 0.65 |
| Example 10 | 4076 | 2.51 | 74 | 2.48 | 113 | 0.86 |
| Example 11 | 5111 | 2.32 | 75 | 2.60 | 89 | 0.81 |
| Example 12 | 3894 | 2.62 | 46 | 2.76 | 85 | 0.99 |
| Comparative Example 1 | 31000 | 1 | 57 | 2.84 | 5 | 0.06 |
| Comparative Example 2 | 15000 | 2.11 | 54 | 3.41 | 26 | 0.26 |
| Comparative Example 3 | 71000 | 3.98 | 68 | 4.24 | 16 | 0.17 |

The invention claimed is:

1. A curable composition satisfying a relationship of the following Expression 1:

$$\frac{A \times B \times C}{D} \times 1000 \geq 30 \qquad \text{[Expression 1]}$$

where, in Expression 1, A represents a dielectric constant of the composition at 1 MHz after curing, B represents a gel fraction (%) of the composition after curing, C represents a shrinkage rate (%) of the composition after curing, and D represents a storage modulus (Pa) of the composition after curing;
wherein the curable composition comprises an active energy ray curable oligomer and a rubber component,
wherein the active energy ray curable oligomer includes a polydiene backbone having a hydroxyl group, the rubber component is a polydiene having a hydroxyl group, and the rubber component is included at 50 wt % to 70 wt %.

2. The composition of claim 1, wherein the dielectric constant at 1 MHz after curing is 3.5 or less.

3. The composition of claim 1, wherein the gel fraction (%) after curing ranges from 30% to 80%.

4. The composition of claim 1, wherein the shrinkage rate after curing ranges from 1.5% to 3.0%.

5. The composition of claim 1, wherein the storage modulus after curing is 20,000 Pa or less.

6. The composition of claim 1, wherein a peel strength with respect to glass measured at room temperature, a peel angle of 180° and a peel rate of 300 mm/min after curing is 0.3 N/m or more.

7. The composition of claim 1, wherein transmittance in the visible region is 80% or more after curing.

8. The composition of claim 1, wherein the active energy ray curable oligomer is at least one selected from the group consisting of a urethane-based (meth)acrylate oligomer, a polyester-based (meth)acrylate oligomer, a polyether-based (meth)acrylate oligomer, an epoxy-based (meth)acrylate oligomer, a diene polymer-based (meth)acrylate oligomer and an oligomer having a main chain of a hydrogenated diene polymer-based (meth)acrylate.

9. A cured product satisfying a relationship of the following Expression 1:

$$\frac{A \times B \times C}{D} \times 1000 \geq 30 \qquad \text{[Expression 1]}$$

where, in Expression 1, A represents a dielectric constant of the cured product at 1 MHz, B represents a gel fraction (%) of the cured product, C represents a shrinkage rate (%) of the cured product, and D represents a storage modulus (Pa) of the cured product
wherein the cured product is formed by the curable composition according to claim 1.

10. A display panel body, comprising a display body and an optical functional material adhered using the curable composition of claim 1.

11. A display device, comprising a touch panel and a display panel adhered using the curable composition of claim 1.

12. A display device, comprising:
an optical functional material;
a display panel;
a spacer, spacing the optical functional material away from the display panel; and
the curable composition of claim 1 filling the space between the optical functional material and the display panel.

13. A display device, comprising:
an optical functional material;
a display panel;
a spacer, spacing the optical functional material away from the display panel; and
the cured product of claim 9 filling the space between the optical functional material and the display panel.

* * * * *